(12) United States Patent
Kadowaki et al.

(10) Patent No.: US 8,770,559 B2
(45) Date of Patent: Jul. 8, 2014

(54) LIQUID SEALED VIBRATION ISOLATING DEVICE

(75) Inventors: Hirokazu Kadowaki, Fujimino (JP); Kazutoshi Satori, Fujimino (JP)

(73) Assignee: Yamashita Rubber Kabushiki Kaisha, Fujimino-Shi (JP)

( * ) Notice: Subject to any disclaimer, the term of this patent is extended or adjusted under 35 U.S.C. 154(b) by 641 days.

(21) Appl. No.: 12/142,209

(22) Filed: Jun. 19, 2008

(65) Prior Publication Data

US 2008/0315472 A1  Dec. 25, 2008

(30) Foreign Application Priority Data

Jun. 20, 2007  (JP) ................................. 2007-163213

(51) Int. Cl.
*F16F 5/00* (2006.01)
(52) U.S. Cl.
USPC .................................. 267/140.13; 267/141.4
(58) Field of Classification Search
USPC ............... 267/140.13, 141.4, 140.11, 140.12, 267/140.2–140.4, 141, 141.3, 141.5–141.7
See application file for complete search history.

(56) References Cited

U.S. PATENT DOCUMENTS

| | | | | |
|---|---|---|---|---|
| 5,145,156 A | * | 9/1992 | Muramatsu et al. | 267/140.14 |
| 5,167,403 A | * | 12/1992 | Muramatsu et al. | 267/140.13 |
| 5,273,262 A | * | 12/1993 | Baldini et al. | 267/140.13 |
| 5,501,433 A | * | 3/1996 | Satori | 267/140.13 |
| 5,988,611 A | * | 11/1999 | Takashima et al. | 267/140.13 |
| 6,257,562 B1 | * | 7/2001 | Takashima et al. | 267/141.1 |
| 6,386,527 B2 | * | 5/2002 | Oberle | 267/140.14 |
| 7,048,264 B2 | * | 5/2006 | Anzawa et al. | 267/140.13 |
| 2002/0117788 A1 | * | 8/2002 | West | 267/140.12 |
| 2004/0145125 A1 | * | 7/2004 | Satori et al. | 277/628 |

FOREIGN PATENT DOCUMENTS

JP   2004-324826   11/2004

* cited by examiner

*Primary Examiner* — Xuan Lan Nguyen
(74) *Attorney, Agent, or Firm* — Rankin, Hill & Clark LLP

(57) ABSTRACT

A liquid sealed vibration isolating device has first and second mounting members and an insulator placed between the mounting members. A partition member partitions a liquid chamber into primary and secondary liquid chambers. A valve portion provided on a diaphragm enclosing the secondary liquid chamber opens and closes a port of a passage between the liquid chambers. The valve portion has an annular thick wall portion which contacts a valve seat portion provided around the port and a movable elastic diaphragm portion provided on an inside of the wall portion and is thinner than the wall portion so as to be elastically deformable by a pressure of the hydraulic liquid. The hydraulic liquid passing through the passage causes orifice resonance when the passage is opened by the valve portion. The diaphragm, including the valve portion, membrane-resonates at a frequency in the vicinity of a resonance frequency of the orifice resonance.

4 Claims, 9 Drawing Sheets

Fig. 2
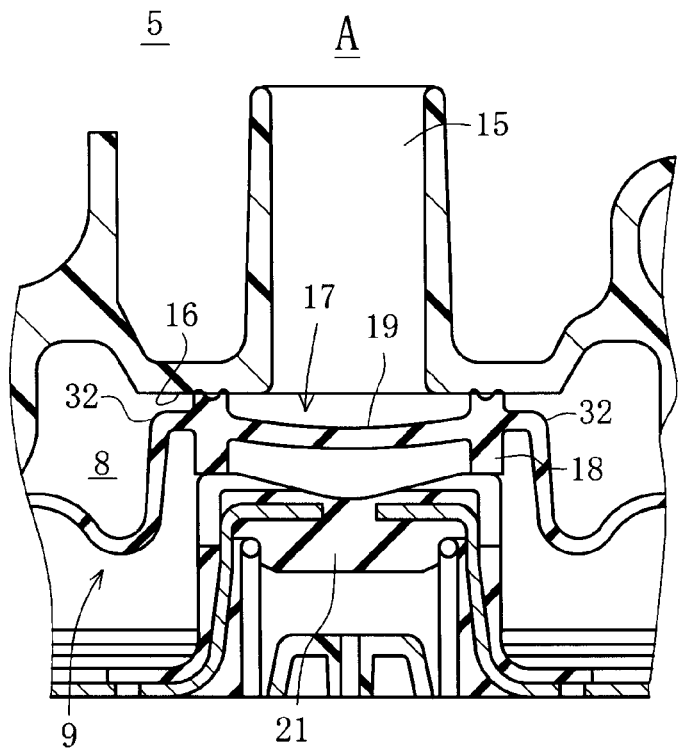
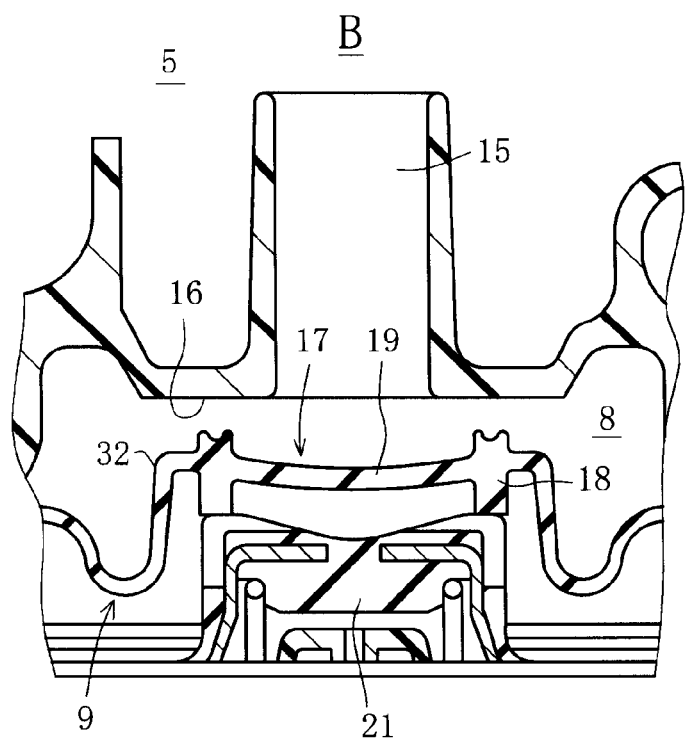

LIQUID SEALED VIBRATION ISOLATING DEVICE

BACKGROUND OF THE INVENTION

1. Field of the Invention

The present invention relates to a liquid sealed vibration isolating device for use in an engine mount for a motor vehicle, which is provided with a resonance orifice passage to isolate vibrations by liquid column resonance of the resonance orifice passage, and more particularly, to the device capable of widening a range of a resonance frequency.

2. Description of the Related Art

FIG. 8 is a cross sectional view showing a conventional liquid sealed engine mount and FIG. 9 is an enlarged cross sectional view showing a diaphragm section. Referring to these drawings, a damping orifice passage 107 and an idle orifice passage 115 are provided in a partition member 106 to communicate between a primary liquid chamber 105 enclosed by an insulator 104 and a secondary liquid chamber 108 enclosed by a diaphragm 109. The idle orifice passage 115 is opened and closed by a valve portion 117 provided in a portion of the diaphragm 109. The valve portion 117 is formed considerably thicker than a surrounding portion 131 of the diaphragm 109 which surrounds the valve portion 117. The surrounding portion 131 is obliquely connected to an outer peripheral portion of the valve portion 117.

Patent reference 1: Japanese patent laid open publication No. 2004-324826.

By the way, the diaphragm 109 in the above structure has hardly any spring and produces no membrane resonance in a range effective in isolating the vibration, so that a membrane characteristic of the diaphragm 109 itself does not contribute to a decrease in dynamic spring constant. In particular, if the valve portion 117 is capable of being elastically deformed when the valve portion 117 is closed, it can contribute to the decrease in dynamic spring constant, but it is too thick to expect such contribution. Further, when the valve portion 117 is opened, the diaphragm 109 is easily deformed entirely and the valve portion 117 is not elastically deformed whether the central valve portion 117 has high rigidity. Even if the valve portion 117 starts deformation, the surrounding portion 131 finishes deformation first since it is easy to deform, so as not to cause the valve portion 117 to be elastically deformed. Thus, the diaphragm 109 as a whole does not produce the membrane resonance in the effective range in vibration isolation.

Accordingly, the present invention has its object to provide a liquid sealed vibration isolating device in which the diaphragm membrane-resonates in a desirable frequency range of the effective range in vibration isolation so as to contribute to the decrease in dynamic spring constant.

SUMMARY OF THE INVENTION

To achieve the above mentioned object, a liquid sealed vibration isolating device according to a first aspect of the present invention comprises a first mounting member to be mounted on the side of a vibration source, a second mounting member to be mounted on the side to be vibrated, an insulator being placed between the first and second mounting members so as to absorb the vibration, a liquid chamber using the insulator as a part of the wall thereof and being filled with a hydraulic liquid, a partition member for partitioning the liquid chamber into a primary liquid chamber and a secondary liquid chamber, an opening and closing orifice passage being provided between the primary liquid chamber and the secondary liquid chamber, and a valve portion being provided on a part of a diaphragm enclosing the secondary liquid chamber to open and close a port of the opening and closing orifice passage, wherein the valve portion comprises an annular thick wall portion which comes into contact with a valve seat portion provided around the port of the opening and closing orifice passage and a central movable elastic diaphragm portion which is provided on the inside of the annular thick wall portion and which is thinner than the annular thick wall portion to be elastically deformable by a liquid pressure of the hydraulic liquid, the hydraulic liquid passing through the opening and closing orifice passage is adapted to produce orifice resonance when the opening and closing orifice passage is opened by the valve portion, and wherein the diaphragm including the valve portion is adapted to membrane-resonate at a frequency in the vicinity of a resonance frequency of the orifice resonance.

According to a second aspect of the present invention, the central movable elastic diaphragm portion is as thick as an average thickness of a flexibly deformable portion around the annular thick wall portion of the diaphragm.

According to a third aspect of the present invention, the central movable elastic diaphragm portion has a flexible form to be concaved in an outward direction of the liquid chamber.

According to a fourth aspect of the present invention, the resonance frequency of the membrane resonance of the central movable elastic diaphragm portion is in the vicinity of a peak frequency of anti-resonance produced by liquid column resonance in the opening and closing orifice passage.

According to a fifth aspect of the present invention, the resonance frequency of the membrane resonance of the central movable elastic diaphragm portion is in the vicinity of the lowest frequency of a dynamic spring constant created by liquid column resonance in the opening and closing orifice passage.

According to a sixth aspect of the present invention, the annular thick wall portion is formed as a bent portion being bent substantially at right angles.

According to a seventh aspect of the present invention, the bent portion forming the annular thick wall portion comprises a horizontal portion which substantially horizontally extends outwardly from an outer periphery of the valve portion, and a cylindrical portion being bent substantially at right angles from the horizontal portion.

According to an eighth aspect of the present invention, when the valve portion is closed, the central movable elastic diaphragm portion is adapted to membrane-resonate at a predetermined resonance frequency.

According to a ninth aspect of the present invention, a liquid sealed vibration isolating device according to a ninth aspect of the present invention comprises a first mounting member to be mounted on the side of a vibration source, a second mounting member to be mounted on the side to be vibrated, an insulator being placed between the first and second mounting members so as to absorb the vibration, a liquid chamber using the insulator as a part of the wall thereof and being filled with a hydraulic liquid, a partition member for partitioning the liquid chamber into a primary liquid chamber and a secondary liquid chamber, an orifice passage which is open at all times being provided to communicate between the primary liquid chamber and the secondary liquid chamber, and a diaphragm enclosing the secondary liquid chamber, wherein the diaphragm comprises an annular thick wall portion which is provided in a region opposite to a port of the orifice passage and a central movable elastic diaphragm portion which is provided on the inside of the annular thick wall portion and which is thinner than the annular thick wall portion to be elastically deformable by a liquid pressure of the hydraulic liquid, the annular thick wall portion and the orifice passage are adapted to produce orifice resonance by the hydraulic liquid flowing therethrough, and wherein the diaphragm including the annular thick wall portion and the central movable elastic diaphragm portion is adapted to membrane-resonate at a frequency in the vicinity of a resonance frequency of the orifice resonance.

According to the invention as defined in the first aspect, since the valve portion comprises the annular thick wall portion which comes into contact with the valve seat portion provided around the port of the opening and closing orifice passage and the central movable elastic diaphragm portion which is provided on the inside of the annular thick wall portion and is thinner than the annular thick wall portion to be elastically deformable by the liquid pressure of the hydraulic liquid, the hydraulic liquid passing through the opening and closing orifice passage produces the orifice resonance when the opening and closing orifice passage is opened by the valve portion, while the diaphragm including the valve portion membrane-resonates at the frequency in the vicinity of a resonance frequency of the orifice resonance. Therefore, a low dynamic spring constant which is realized by the orifice resonance can be lowered further by the membrane resonance.

According to the invention as defined in the second aspect, since the central movable elastic diaphragm portion is as thick as an average thickness of the flexibly deformable portion in the vicinity of the annular thick wall portion of the diaphragm, it is possible to make it easy to produce the membrane resonance by the central movable elastic diaphragm portion.

According to the invention as defined in the third aspect, since the central movable elastic diaphragm portion has the flexible form to be concaved in the outward direction of the liquid chamber, the spring constant of the central movable elastic diaphragm portion is decreased so that the membrane resonance may be produced more easily.

According to the invention as defined in the fourth aspect, since the resonance frequency of the membrane resonance of the central movable elastic diaphragm portion is in the vicinity of the peak frequency of the anti-resonance produced by the liquid column resonance in the opening and closing orifice passage, the peak of the liquid column resonance of the opening and closing orifice passage may be canceled by the membrane resonance so as to realize the decrease in dynamic spring constant.

According to the invention as defined in the fifth aspect, if the membrane resonance of the central movable elastic diaphragm portion is set at the vicinity of the bottom frequency by the orifice resonance, i.e. the lowest frequency of the dynamic spring constant of the resonance section, it is possible to perform the tuning to further lower the bottom of a dynamic spring constant curve.

According to the invention as defined in the sixth aspect, since the annular thick wall portion is formed as the bent portion being bent substantially at right angles, the rigidity is increased with respect to the vibration input directed to the valve portion thereby making the central movable elastic diaphragm portion easily elastically deformable.

According to the invention as defined in the seventh aspect, since the bent portion forming the annular thick wall portion comprises the horizontal portion which substantially horizontally extends outwardly from the periphery of the valve portion and the cylindrical portion being bent substantially at right angles from the horizontal portion, the rigidity against the vibration input directed to the valve portion through the cylindrical portion may be increased.

According to the invention as defined in the eighth aspect, the central movable elastic diaphragm portion membrane-resonates at the predetermined resonance frequency when the valve portion is closed, thus contributing to the decrease in dynamic spring constant.

According to the invention as defined in the ninth aspect, since the diaphragm is provided with the annular thick wall portion and the central movable elastic diaphragm portion which are located in opposition to the open orifice passage, the decrease in dynamic spring constant may be realized by the membrane resonance of the diaphragm side in cooperation with the orifice resonance in the open orifice passage.

BRIEF DESCRIPTION OF THE DRAWINGS

FIGS. 2-A and 2-B are views in explaining the valve opening closing condition of the embodiment;

DETAILED DESCRIPTION OF THE PREFERRED EMBODIMENT

Figure 1:
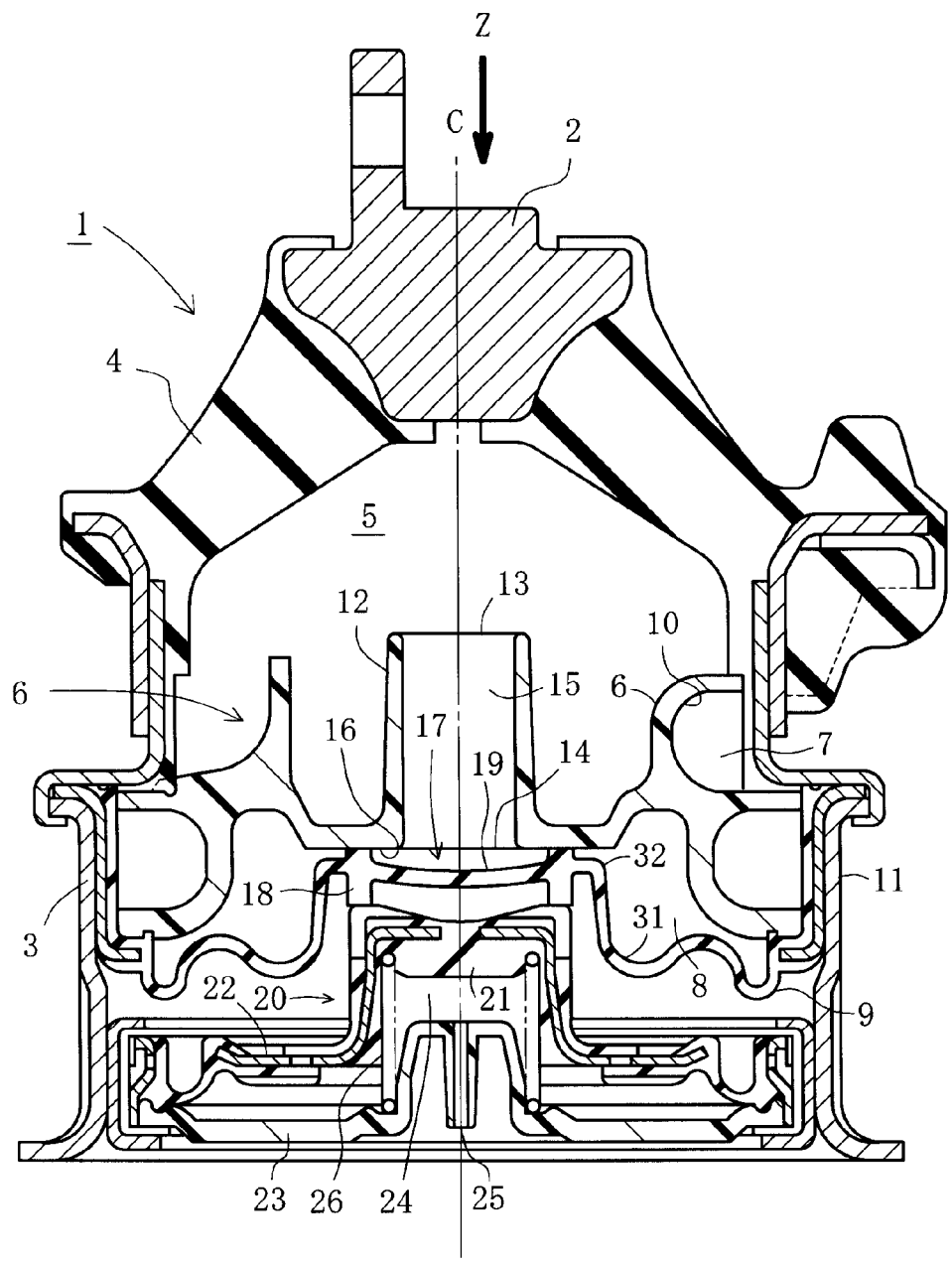
FIG. 1 is a cross sectional view of a liquid sealed engine mount according to an embodiment of the present invention.

Hereinafter, the embodiment of a liquid sealed engine mount will be explained with reference to the accompanying drawings, wherein FIG. 1 is a cross sectional view of the whole of the engine mount taken along a central axis C parallel to an input direction of a principal vibration to be isolated, and FIGS. 2-A and 2-B are enlarged cross sectional views showing a diaphragm together with a partition member. In the following explanation, each expression of the directions such as "upward" and "downward" is used based on an illustrated state in FIG. 1.

Referring now to FIG. 1, the liquid sealed engine mount 1 comprises a first mounting member 2, a second mounting member 3 and an insulator 4. The first mounting member 2 is connected to the side of a vibration source such as an engine (not shown) or the like. The second mounting member 3 is connected to the vibration receiving side such as a vehicle body (not shown) or the like.

The insulator 4 is a publicly known vibration isolating rubber substantially in the shape of cone and connects the first mounting member 2 and the second mounting member 3 together. Incidentally, the insulator 3 may be formed by a known vibration isolating elastic member of conical shape consisting of a proper elastic material such as rubber or other elastomer.

A primary liquid chamber 5 is formed in an inner space enclosed by the first mounting member 2, the second mounting member 3 and the insulator 4 and is filled with a known incompressible hydraulic liquid. The primary liquid chamber 5 is in communication with a secondary liquid chamber 8 through the intermediary of a damping orifice passage 7 provided on an outer peripheral portion of a partition member 6. The damping orifice passage 7 is an orifice passage which is open at all times to absorb at a high damping rate the vibration of low frequency and lesser amplitude of about 10 Hz at the time of traveling in a normal condition which exerts an influence on a riding quality. The secondary liquid chamber 8 is covered by a diaphragm 9.

The partition member 6 is a rigid member made of resin or metal and has an outer peripheral orifice passage groove 10 which is open outwardly in a spiral shape. The orifice passage groove 10 is closed by an inner peripheral wall of a cylindrical portion 11 forming a portion of the second mounting member 3 so as to form the damping orifice passage 7. In the central area of the partition member 6 there is provided a center cylindrical portion 12 which extends upwardly like a chimney toward the upper area within the primary liquid chamber 5. An upper port 13 of the center cylindrical portion 12 is open into the primary liquid chamber 5 while a lower end thereof forms a lower port 14 which is open to the central area of the partition member 6. An idle orifice passage 15 is formed inside of the center cylindrical portion 12.

A valve seat portion 16 is formed on the periphery of the lower port 14 on the bottom wall of the partition member 6 while a valve portion 17 formed by an annular rim portion 18 is provided on the central area of the diaphragm 9 so as to open and close the idle orifice passage 15 in such a manner that a top surface of the annular rim portion 18 is contacted with and separated from the valve seat portion 16. The idle orifice passage 15 corresponds to an opening and closing orifice passage in the present invention.

The idle orifice passage 15 communicates between the primary liquid chamber 5 and the secondary liquid chamber 8 by having the valve portion 17 opened at the time of idling the engine so as to flow the hydraulic liquid into the idle orifice passage 15, so that liquid column resonance is produced at the frequency of an engine vibration during idling to decrease the dynamic spring constant, thereby isolating the transmission of the vibration from the side of the first mounting member 2 to the side of the second mounting member 3. The annular rim portion 18 is a thick rigid annular portion which is integrally formed on the central area of the diaphragm 9 and projects upwardly and downwardly. A central portion surrounded by the annular rim portion 18 forms a thin central movable elastic diaphragm portion 19. This central movable elastic diaphragm portion 19 has a concave wall curved a little downwardly at the center area thereof and is adapted to membrane-resonate at a predetermined frequency. The central movable elastic diaphragm portion 19 is flexible because of its concave form and has low membrane rigidity to decrease the spring constant.

The valve portion 17 is operated to open and close by a telescopic member 20 which is able to telescope in the upward and downward direction of the drawing in such a manner that it is opened during an idling operation of the engine and closed in other driving condition of the engine. Namely, when the driving condition of the engine turns from the non-idling condition to the idling condition, a pushing portion 21 which presses the valve portion 17 against the valve seat portion 16 to close the idle orifice passage 15 is retracted to go back downwardly so as to release the valve portion 17 to a freely movable position, so that the annular rim portion 18 is separated from the valve seat portion 16 to open the idle orifice passage 15. On the contrary, when turning from the idling condition to the non-idling condition, the pushing portion 21 extends upwardly to press the valve portion 17 upwardly, so that the annular rim portion 18 is pressed against the valve seat portion 16 to shut the lower port 14 thereby closing the idle orifice passage 15.

The telescopic member 20 is roughly speaking in the shape of a disc and is formed by having an movable portion 22 of elastic material and a bottom portion 23 of rigid material placed one on another and air-tightly connected to each other at the peripheral portions thereof while having a hollow negative pressure chamber 24 formed inside thereof. The negative pressure chamber 24 is adapted to switch the connection between an intake negative pressure and an atmospheric pressure through a ventilation nozzle 25.

The upwardly projecting pushing portion 21 is provided in the center of the movable portion 22, and a return spring 26 is arranged between a thick apex portion reinforced by metal and the bottom portion 23 to push the pushing portion 21 upwardly so as to spring-bias the valve portion 17 in the closing direction. When the negative pressure chamber 24 turns the negative pressure by the application of the intake negative pressure, the pushing portion 21 moves downwardly in the drawing against the return spring 26. When the negative pressure chamber 24 is open to the atmosphere while blocking the intake negative pressure, the pushing portion 21 extends upwardly in the drawing under the action of return spring 26.

FIG. 2 shows an opening and closing condition of the valve portion 17, wherein FIG. 2-A is a view in the closed condition of the valve portion 17 and FIG. 2-B is a view in the open condition of the valve portion 17. When the valve portion 17 is closed, the annular rim portion 18 is pressed against and held to the valve seat portion 16 by the pushing portion 21 so as to allow only the central movable elastic diaphragm portion 19 to be elastically deformable. When the valve portion is open, the whole of the diaphragm 9 is elastically deformable by the release of the annular rim portion 18. However, the annular rim portion 18 and a crank-shaped portion as explained hereunder make the central movable elastic diaphragm portion 19 easily elastically deformable, so that the membrane resonance is produced in the frequency range effective in the vibration isolation.

Figure 3:
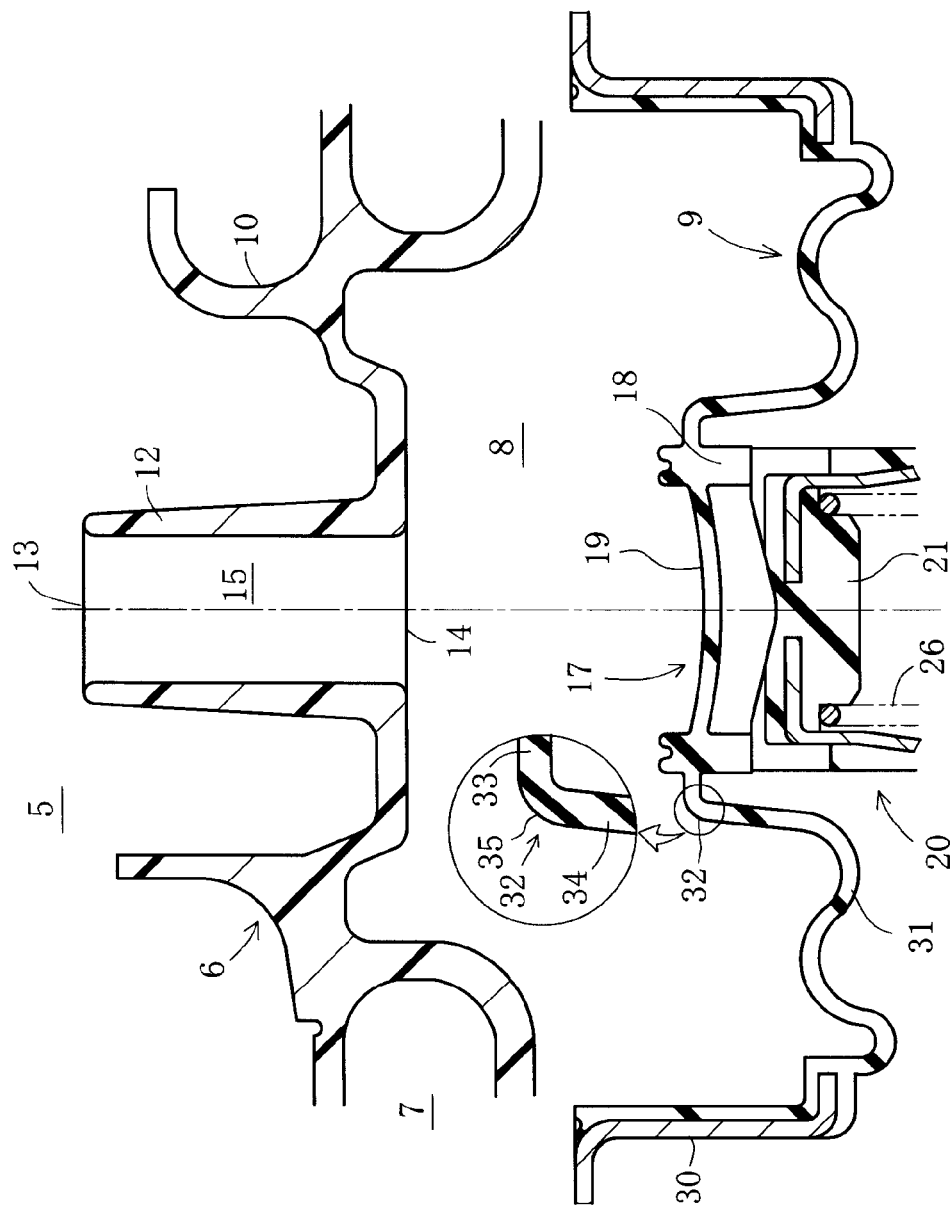
FIG. 3 is an enlarged cross sectional view of a diaphragm section of the embodiment.

As shown in FIG. 3, the outer peripheral portion of the diaphragm 9 is integrally formed with a ring-shaped metal fitting 30. An inner portion located inwardly of the outer peripheral portion constrained by the metal fitting 30 is formed to be movable. This movable portion is partitioned into a center section and a peripheral section by the rigid annular rim portion 18, and the center section forms the central movable elastic diaphragm portion 19. The peripheral section 31 located between the annular rim portion 18 and the metal fitting 30 is formed in the mutable structure bent in a wave form and is flexibly deformable due to this mutable structure.

The thickness of the peripheral section 31 is substantially identical to that of the central movable elastic diaphragm portion 19, and the thickness of about 1.5 mm is preferable since it is possible to display the best function as the movable diaphragm. The upper limit is about 3.0 mm at which the function as the movable diaphragm is impaired due to high rigidity. The lower limit is about 1.0 mm in view of durability. Herein, the diaphragm thickness of the peripheral section 31 denotes an average diaphragm thickness of flexibly deformable section extending from an inner peripheral end connected to a shoulder portion 35 to an outer peripheral end supported by the metal fitting 30.

As shown in an enlarged scale in the drawing, the connecting portion between the annular rim portion 18 and the peripheral section 31 located outside thereof forms the crank-shaped portion 32. This crank-shaped portion 32 comprises a horizontal wall 33 substantially horizontally projecting outwardly of the annular rim portion 18 and a substantially perpendicularly extending vertical wall 34 and is bent substantially at right angles at the shoulder portion 35. The vertical wall 34 constitutes a cylindrical portion having the axis extending in the vertical direction. With this structure, the flexural rigidity is increased with respect to the vibration inputted to the valve portion 17 in the vertical direction from the upper side so as not to be subject to buckling. Therefore, when the diaphragm 9 is elastically deformed in the upward and downward direction in the open condition of the valve portion 17 as shown in the drawing, the diaphragm 9 as a whole is not elastically deformed uniformly due to the rigidity of especially the vertical wall 34 of the crank-shaped portion 32. Then, the section located inwardly of the crank-shaped portion 32 is less deformable than the peripheral section 31.

Hence, the elastic deformation by the central movable elastic diaphragm portion 19 is easily developed. In the meantime, the whole of the diaphragm 9 causes the membrane resonance at the frequency of about 60 Hz, for example. The membrane resonance at this frequency is to be welcomed since the vibration isolation is performed in the desired frequency range. Thus, although in the conventional diaphragm which is not provided with the crank-shaped portion 32, the annular rim portion 18 and the central movable elastic diaphragm portion 19, the spring is too small to be considered, it is possible to effectively produce the resonance at the preferred frequency range in the present invention.

Figure 4:
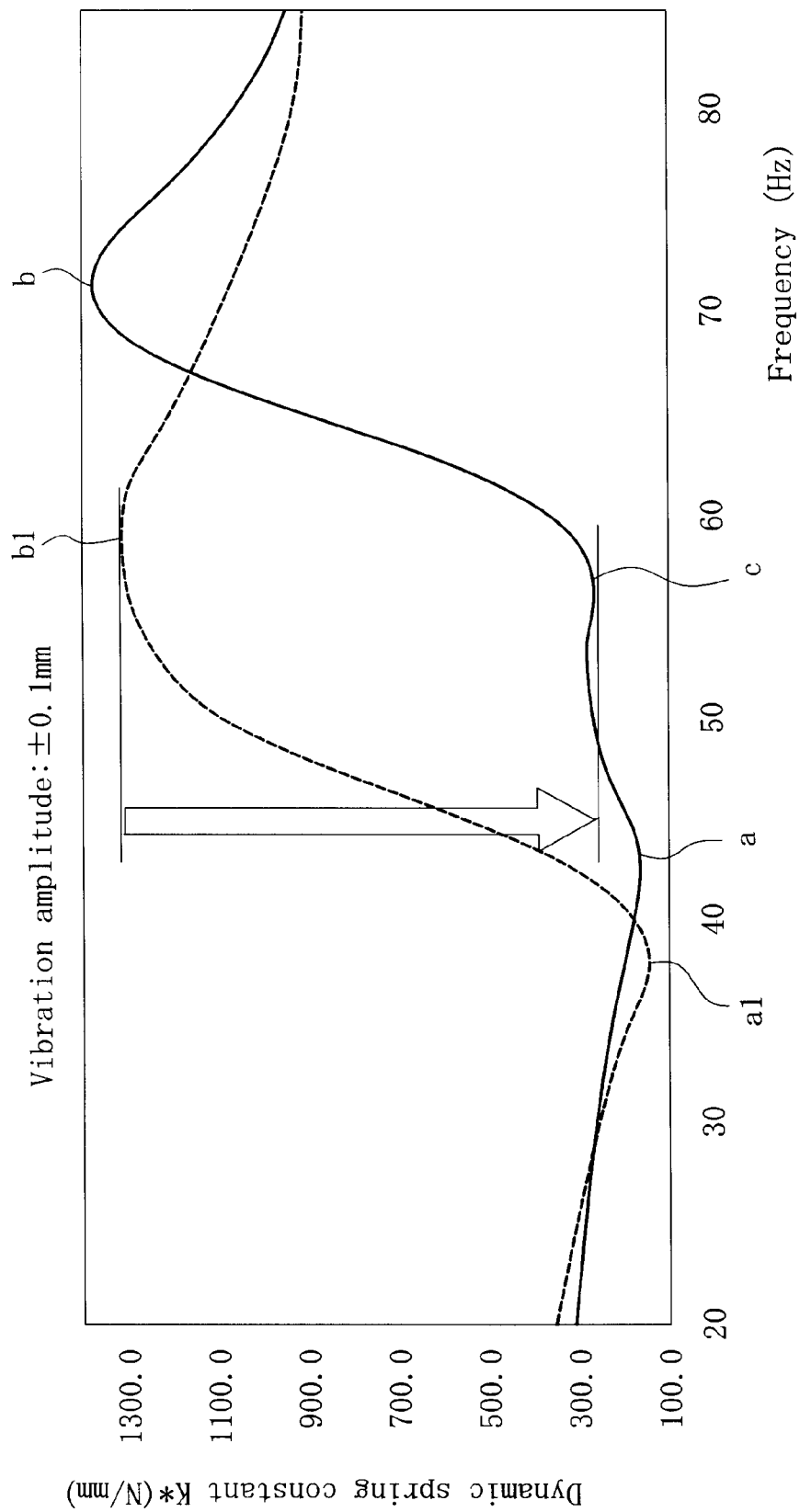
FIG. 4 is a graph showing dynamic characteristics when a valve is opened.

FIG. 4 is a graph showing the effect of the resonance by the diaphragm according to the present invention when the valve portion 17 is in the open position and the device is vibrated at ±0.1 mm amplitude. In the conventional example that the valve portion 17 has high rigidity and the resonance is hardly expected, the resonance is produced at a bottom "a1" of a dynamic spring constant curve and a peak of anti-resonance appears at "b1". On the other hand, in the present invention, although one bottom "a" appears substantially at the same location as "a1", another bottom "c" appears substantially at the frequency of "b1". This indicates that the difference in dynamic spring constant between "b1" and "c" is obtained by the resonance mainly of the central movable elastic diaphragm portion 19 of the diaphragm 9.

Incidentally, while a peak "b" of the present invention appears at a substantially same height as "b1", the frequency at the time when the peak appears is considerably off to the side of high frequency thereby to widen the low dynamic spring constant range by such offset amount.

Figure 5:
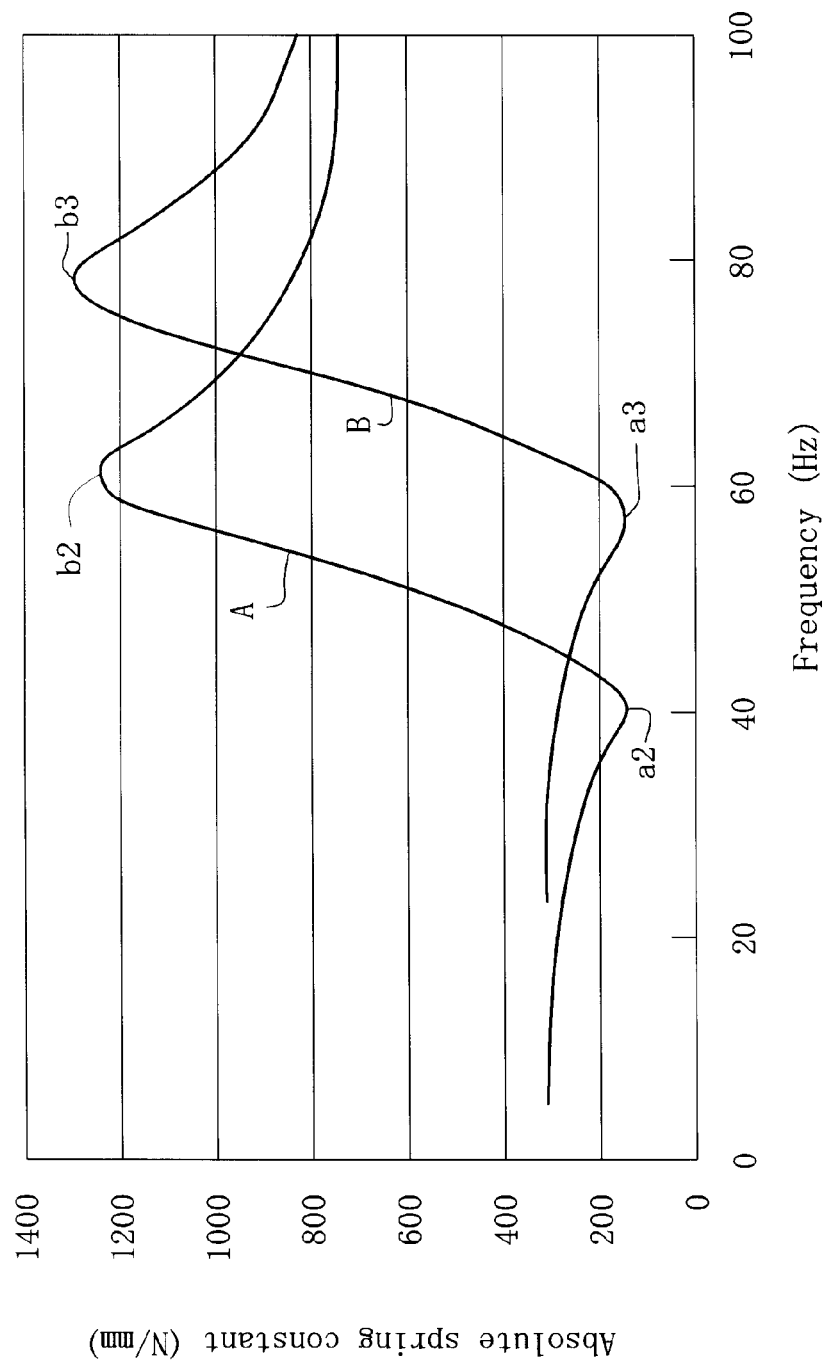
FIG. 5 is a graph in explaining the tuning of resonance.

FIG. 5 is a graph showing a tuning method of resonance with respect to the diaphragm 9. The reference character "A" denotes a dynamic spring constant curve in the case where only the idle orifice resonance is caused without being accompanied by the resonance by the diaphragm 9, wherein a bottom appears at "a2" and a peak appears at "b2". "a2" and "b2" substantially correspond to "a1" and "b1" in FIG. 4.

Figure 6:
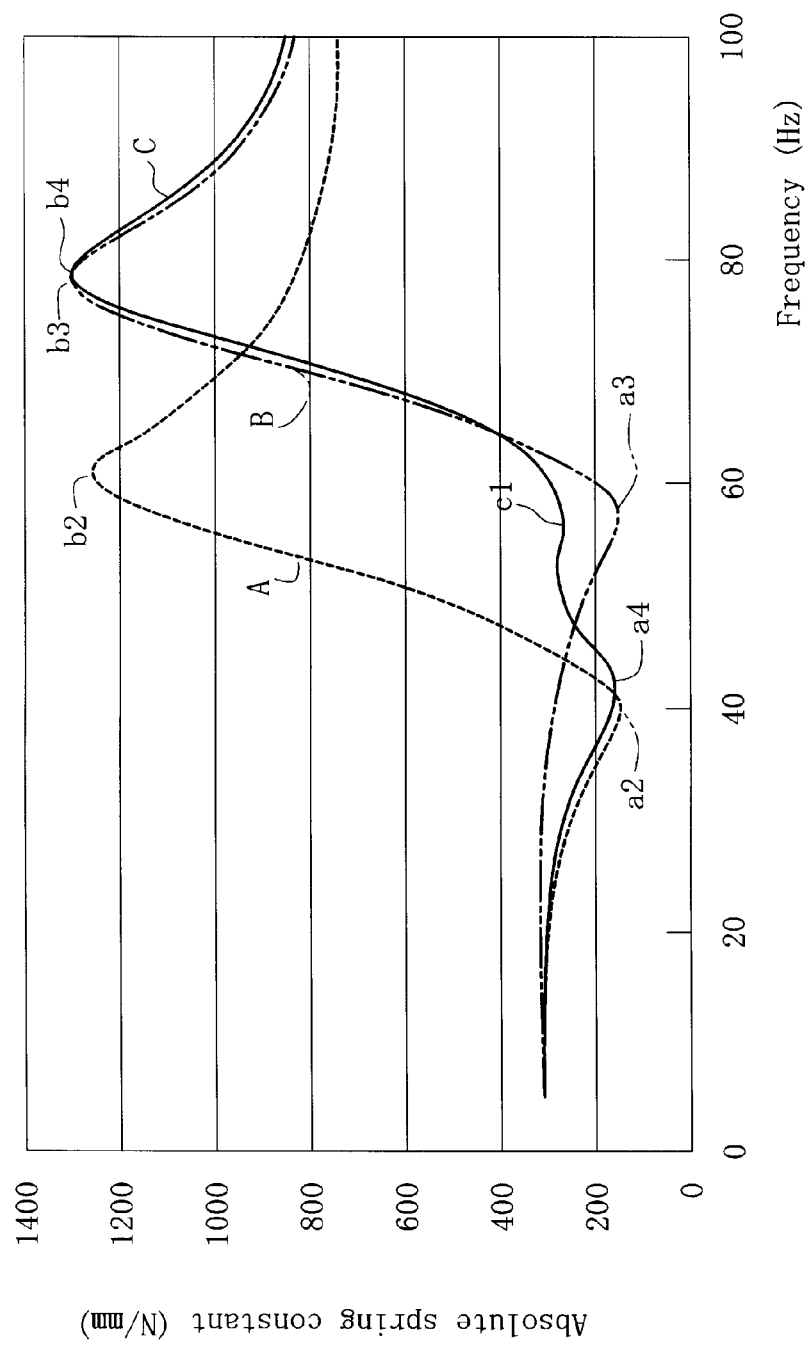
FIG. 6 is a graph similar to FIG. 5.

The reference character "B" is a dynamic spring constant curve in which a bottom "a3" is moved to the high frequency side to be placed in the location of the same frequency as the peak "b2". Each of the dynamic spring constant curves has the substantially same form. When these dynamic spring constant curves are placed one upon another and combined, a compound dynamic spring constant curve "C" as shown in FIG. 6 is formed. This compound dynamic spring curve C is provided with a new bottom "c1" (substantially similar to "a3") other than a bottom "a4" (substantially similar to "a2") and has a peak "b4" (substantially similar to "b3") which is off to the high frequency side, so that it is substantially identical to the dynamic spring curve of the present invention as shown in FIG. 4.

Namely, in the case of obtaining the dynamic spring curve of the present invention as shown in FIG. 4, the dynamic spring curve B is placed on the conventional dynamic spring curve A as shown in FIG. 5 which has no expectation of the membrane resonance on the side of the diaphragm 9, in such a manner that the bottom "a3" is placed on the peak "b2", so that the peak "b2" is cancelled by the bottom "a3". Then, since this bottom "a3" is created by the resonance on the side of the diaphragm 9, the spring constant of the diaphragm 9 is set at a high level to produce the resonance at "a3".

By the way, such spring was not able to be provided since the diaphragm 9 has essentially a lesser spring. However, it became possible to form a proper spring by providing the annular rim portion 18, the inner central movable elastic diaphragm portion 19 and the outer crank-shaped portion 32. Accordingly, the spring can be freely adjusted to obtain the predetermined resonance at "a3" by adjusting the rigidity of the annular rim portion 18, the diaphragm thickness of the central movable elastic diaphragm portion 19, the diaphragm thickness of the crank-shaped portion 32 and the length of the horizontal wall 33 and the vertical wall 34, etc.

When the valve portion 17 is closed, the annular rim portion 18 is pressed against and held to the valve seat portion 16 by the pushing portion 21 as shown in FIG. 1, and the central movable elastic diaphragm portion 19 receives the hydraulic liquid within the idle orifice passage 15. Then, since the diaphragm thickness of the central movable elastic diaphragm portion 19 is thin enough to be elastically deformed, the hydraulic liquid causes resonance (hereinafter, referred to as "hole resonance") in relation to the spring of the insulator 4 and the central movable elastic diaphragm portion 19 when the hydraulic liquid within the idle orifice passage 15 flows. Further, the central movable elastic diaphragm portion 19 is elastically deformed to produce the membrane resonance by the flow of the hydraulic liquid within the idle orifice passage 15. Then, the resonance frequency is heightened since the annular rim portion 18 is held in position.

Figure 7:
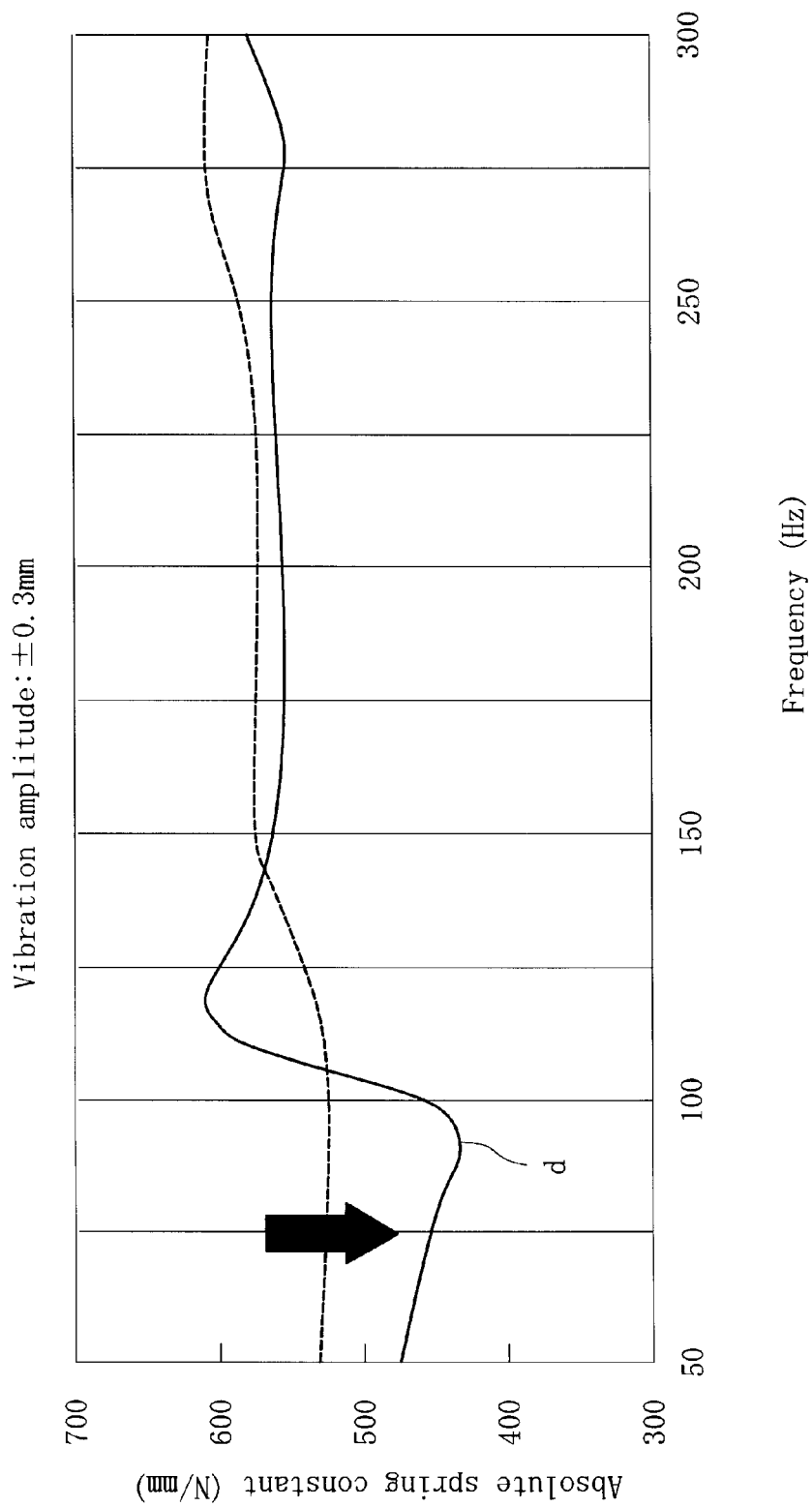
FIG. 7 is a graph showing dynamic characteristics when the valve is closed.
Figure 8:
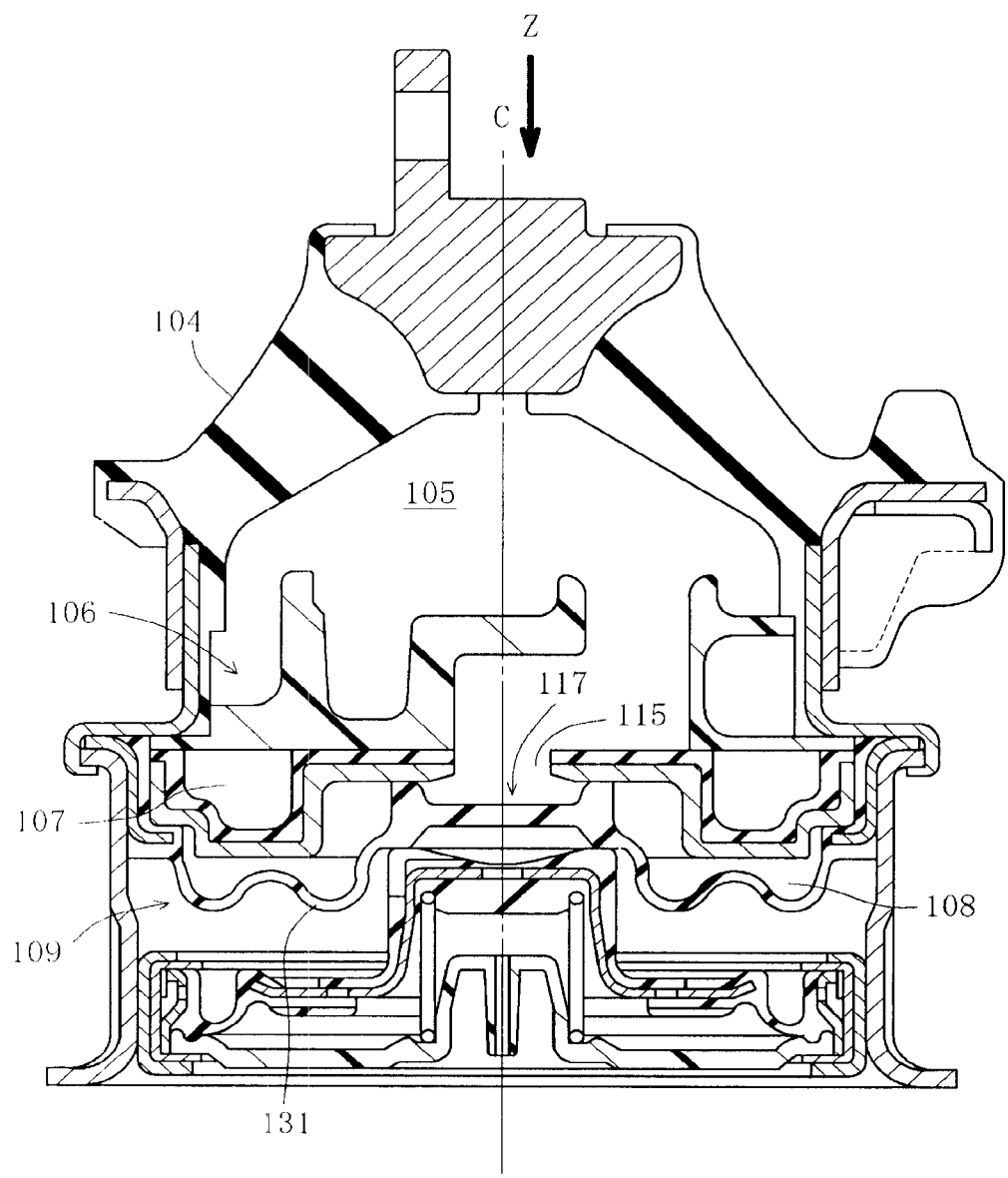
FIG. 8 is a cross sectional view of a conventional liquid sealed engine mount.
Figure 9:
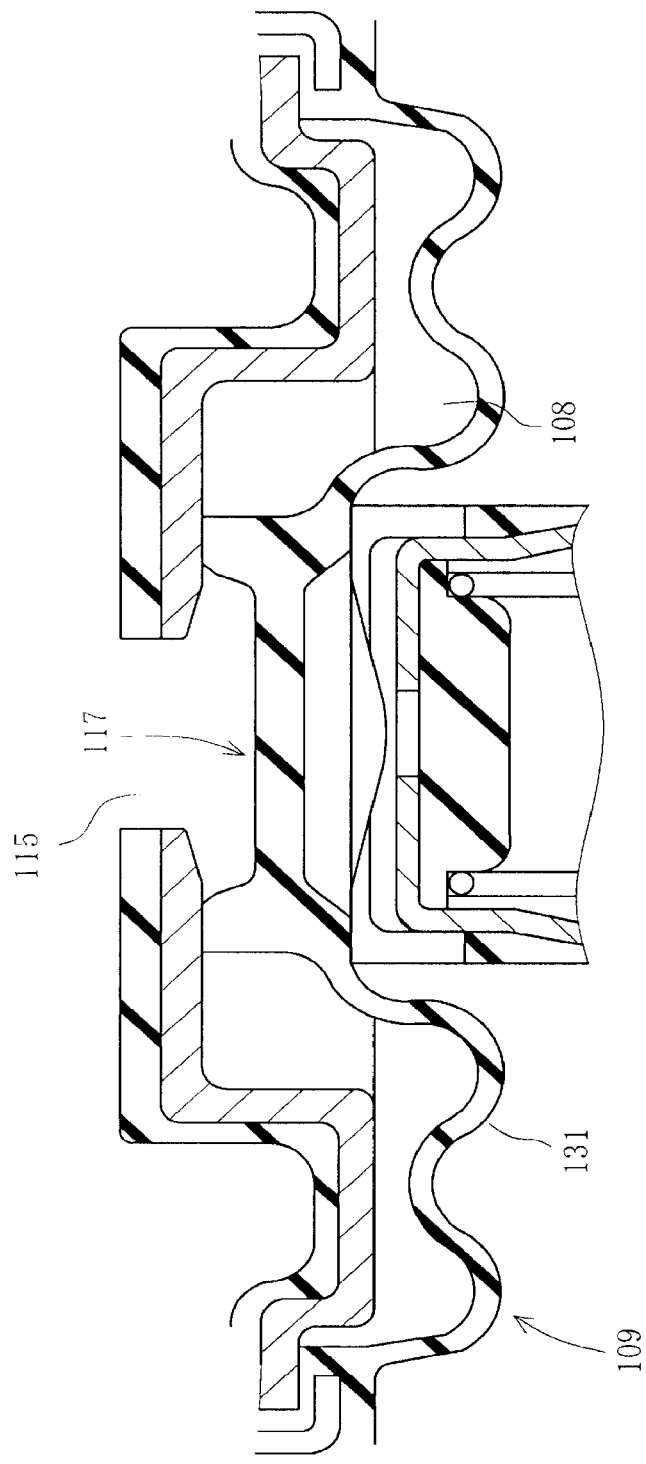
FIG. 9 is an enlarged cross sectional view of a diaphragm section of the above conventional engine mount.

Consequently, the decrease in dynamic spring constant can be realized by the membrane resonance of the central movable elastic diaphragm portion 19. FIG. 7 shows dynamic spring constant curves when the valve portion 17 is in the closed position and the device is vibrated at ±0.3 mm amplitude. While the conventional example without the central movable elastic diaphragm portion 19 has the dynamic spring constant curve of substantially flat form, the dynamic spring constant curve in the embodiment of the present invention with the central movable elastic diaphragm portion 9 has a bottom "d" by resonance to decrease the dynamic spring constant in this area, and shows a tendency to decrease the dynamic spring constant as a whole. Thus, the effect of the resonance by the central movable elastic diaphragm portion 19 is confirmed. Moreover, since the central movable elastic diaphragm portion 19 is formed with concave wall curved downwardly, the central movable elastic diaphragm portion 19 is flexible to decrease the spring constant, so that the effect of resonance by the hole resonance is increased.

While the invention has been described in its preferred embodiment, it is to be understood that the present invention is not limited to the above described embodiment, but various modifications and applications are possible within the scope and spirit of the invention. For example, the opening and closing orifice passage is not limited to the idle orifice passage but may include the one that is tuned to various resonance frequencies, such as an orifice passage resonating to the vibration on starting of the vehicle or the like. If the membrane resonance frequency of the diaphragm 9 is set at a lower value than the resonance frequency of the idle orifice frequency, it is also possible to tune the bottom of the dynamic spring constant curve to a lower level. Further, in the case where the diaphragm 9 which has the annular rim portion 18, the central movable elastic diaphragm portion 19 and the crank-shaped portion 32 is applied to the liquid sealed vibration isolating device which has no opening and closing typed orifice passage but a constantly open orifice passage, the central movable elastic diaphragm portion 19 is arranged opposite to a port of the constantly open orifice passage, so that the decrease in dynamic spring constant by the membrane resonance of the diaphragm 9 can be also realized.

What is claimed is:

1. A liquid sealed vibration isolating device comprising:
   a first mounting member to be mounted on a side of a vibration source,
   a second mounting member to be mounted on a side to be vibrated,
   an insulator being placed between said first and second mounting members so as to absorb vibration,
   a liquid chamber using said insulator as a part of a wall thereof and being filled with a hydraulic liquid,
   a partition member for partitioning said liquid chamber into a primary liquid chamber and a secondary liquid chamber, said partition member including an opening and closing orifice passage provided between said primary liquid chamber and said secondary liquid chamber, and
   a valve portion being provided on a diaphragm enclosing said secondary liquid chamber and moveable between an open position and a closed position to open and close a port of said opening and closing orifice passage, wherein said valve portion is a thick rigid annular portion that is contacted with and separated from a valve seat portion provided around said port of said opening and closing orifice passage and comprises said thick annular wall portion integrally formed on the central area of the diaphragm to project upwardly and downwardly and a central movable elastic diaphragm portion that is provided on an inside of said annular thick wall portion, is thinner than said annular thick wall portion to be elastically deformable by a liquid pressure of the hydraulic liquid, and is elastically deformable in both the open position and closed position of said valve portion,
   said central movable elastic diaphragm portion being formed with a concave wall curved downwardly relative to said primary liquid chamber so that said central movable elastic diaphragm portion is concaved in an outward direction of said primary liquid chamber,
   wherein said central movable elastic diaphragm portion is as thick as an average thickness of a flexibly deformable portion around said annular thick wall portion of said diaphragm,
   wherein said diaphragm is provided with a crank-shaped portion outside of said annular thick wall portion, said crank-shaped portion having a horizontal portion and a vertically extending cylindrical portion, said horizontal portion being substantially aligned with the central moveable elastic diaphragm portion and extending outwardly in a radial direction from an outer periphery of an intermediate portion of said upwardly and downwardly projecting annular thick wall portion, said vertically extending cylindrical portion being bent generally at right angles from a tip of said horizontal portion to extend substantially vertically along the outer periphery of said annular thick wall portion,
   wherein a lower portion of said annular thick wall portion, which is disposed vertically below the intermediate portion of the annular thick wall portion from which the horizontal portion of the crank-shaped portion extends, defines a first cylinder;
   wherein said vertically extending cylindrical portion defines a second cylinder that is generally parallel to, and radially surrounds, the first cylinder, whereby said first and second cylinders form a double cylindrical portion;
   wherein an axis of the vertically extending cylindrical portion extends in an upward and downward direction, said vertically extending cylindrical portion being longer than the annular thick wall portion, said vertically extending cylindrical portion extending in the same direction as the vibration input direction,
   wherein the outer peripheral portion of said vertical portion is integrally formed with a ring-shaped metal fitting through a mutable structure portion bent in a wave form, and,
   wherein said crank-shaped portion is configured to increase rigidity of the vertically extending cylindrical portion with respect to vibration inputted to said valve portion in a vertical direction.

2. The liquid sealed vibration isolating device according to claim 1, wherein the resonance frequency of the membrane resonance of said central movable elastic diaphragm portion is in the vicinity of a peak frequency of anti-resonance produced by liquid column resonance in said opening and closing orifice passage.

3. The liquid sealed vibration isolating device according to claim 1, wherein when said valve portion is closed, said central movable elastic diaphragm portion is adapted to membrane-resonate at a higher resonance frequency than the resonance frequency of said membrane resonance which is generated on said central movable diaphragm portion when said valve portion is opened.

4. A liquid sealed vibration isolating device comprising:
   a first mounting member to be mounted on a side of a vibration source,
   a second mounting member to be mounted on a side to be vibrated,
   an insulator being placed between said first and second mounting members so as to absorb vibration,
   a liquid chamber using said insulator as a part of a wall thereof and being filled with a hydraulic liquid,
   a unitary, one-piece partition member for partitioning said liquid chamber into a primary liquid chamber and a secondary liquid chamber, said partition member including an opening and closing orifice passage being provided to communicate between said primary liquid chamber and said secondary liquid chamber, and
   a diaphragm enclosing said secondary liquid chamber,
   wherein said diaphragm comprises a valve portion including an annular thick wall portion that is provided opposite to the port of said opening and closing orifice passage,
   said valve portion further including a central movable elastic diaphragm portion that is provided inside of said annular thick wall portion and is thinner than said annular thick wall portion in a same degree of an average thickness of a flexural deformed portion around said annular thick wall portion to be elastically deformable by a liquid pressure of the hydraulic liquid, said central movable elastic diaphragm portion being formed with a concave wall concaved in an outward direction of said primary liquid chamber and said concave wall curved downwardly relative to said primary liquid chamber, said central movable elastic diaphragm portion is elastically deformable in both the open position and closed position of said valve portion, and a crank-shaped portion on an outer peripheral side of said annular thick wall portion, said crank-shaped portion having a horizontal portion and a vertically extending cylindrical portion, said horizontal portion being substantially aligned with the central moveable elastic diaphragm portion and extending outwardly in a radial direction from an outer periphery of an intermediate portion of said upwardly and downwardly projecting annular thick wall portion, said vertically extending cylindrical portion being bent substantially at right angles from a tip of said horizontal portion to extend substantially vertically along the outer periphery of said annular thick wall portion, wherein a lower portion of said annular thick wall portion, which is disposed vertically below the intermediate portion of the annular thick wall portion from which the horizontal portion of the crank-shaped portion extends, defines a first cylinder;

wherein said vertically extending cylindrical portion defines a second cylinder that is generally parallel to, and radially surrounds, the first cylinder, whereby said first and second cylinders form a double cylindrical portion;

wherein an axis of the vertically extending cylindrical portion extends in an upward and downward direction, said vertically extending cylindrical portion being is longer than the annular thick wall portion and extends in the same direction as the vibration input direction, wherein the outer peripheral portion of said vertical portion is integrally formed with a ring-shaped metal fitting through a mutable structure portion bent in a wave form, wherein the crank-shaped portion is configured to increase rigidity of a cylindrical portion with respect to vibration inputted to said valve portion in a vertical direction, and, wherein when said valve portion is opened, said opening and closing orifice passage is adapted to produce orifice passage resonance by the hydraulic liquid flowing therethrough.

* * * * *